US009843840B1

(12) United States Patent
Banta et al.

(10) Patent No.: US 9,843,840 B1
(45) Date of Patent: *Dec. 12, 2017

(54) APPARATUS AND METHOD FOR PANORAMIC VIDEO HOSTING (71) Applicant: Amazon Technologies, Inc., Seattle, WA (US)

(72) Inventors: Bill Banta, San Francisco, CA (US); Geoff Donaldson, San Francisco, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/366,878

(22) Filed: Dec. 1, 2016

Related U.S. Application Data (63) Continuation of application No. 13/691,654, filed on Nov. 30, 2012, now Pat. No. 9,516,225.

(60) Provisional application No. 61/566,269, filed on Dec. 2, 2011.

(51) Int. Cl.
H04N 7/00 (2011.01)
H04N 21/4728 (2011.01)
H04N 5/232 (2006.01)
H04N 21/4223 (2011.01)
H04N 21/218 (2011.01)
H04N 21/239 (2011.01)
H04N 21/472 (2011.01)
H04N 21/466 (2011.01)
H04N 21/2343 (2011.01)
H04N 21/81 (2011.01)

(52) U.S. Cl.
CPC ..... H04N 21/4728 (2013.01); H04N 5/23238 (2013.01); H04N 21/21805 (2013.01); H04N 21/2393 (2013.01); H04N 21/23439 (2013.01); H04N 21/234363 (2013.01); H04N 21/4223 (2013.01); H04N 21/4668 (2013.01); H04N 21/47202 (2013.01); H04N 21/816 (2013.01)

(58) Field of Classification Search
CPC ......... H04N 21/21805; H04N 21/2665; H04N 21/41407; H04N 21/44012; H04N 5/23238; H04N 21/8547
USPC .......................................................... 348/36
See application file for complete search history.

(56) References Cited

U.S. PATENT DOCUMENTS

| 5,319,465 | A | 6/1994 | Squyres et al. |
|---|---|---|---|
| 6,043,837 | A | 3/2000 | Driscoll et al. |
| 6,133,944 | A | 10/2000 | Braun et al. |
| 6,192,393 | B1 | 2/2001 | Tarantino et al. |
| 6,611,241 | B1 | 8/2003 | Firester et al. |
| 6,788,333 | B1 | 9/2004 | Uyttendaele et al. |
| 7,324,664 | B1 | 1/2008 | Jouppi et al. |
| 8,334,905 | B2 | 12/2012 | Bhan |
| 8,406,562 | B2 | 3/2013 | Bassi et al. |
| 8,605,783 | B2 * | 12/2013 | El-Saban ......... H04N 21/21805 375/240.1 |
| 8,687,070 | B2 | 4/2014 | Chen et al. |
| 2002/0021353 | A1 | 2/2002 | Denies |
| 2002/0049979 | A1 | 4/2002 | White et al. |

(Continued)

Primary Examiner — Thai Tran
Assistant Examiner — Jose Mesa
(74) Attorney, Agent, or Firm — K&L Gates LLP (57) ABSTRACT A server includes an input node to receive video streams forming a panoramic video. A module forms a suggested field of view in the panoramic video. An output node sends the suggested field of view to a client device.

20 Claims, 4 Drawing Sheets (56) References Cited

U.S. PATENT DOCUMENTS

| | | |
|---|---|---|
| 2004/0030527 A1 | 2/2004 | Rankin |
| 2004/0032495 A1 | 2/2004 | Ortiz |
| 2004/0264919 A1* | 12/2004 | Taylor .................. G11B 27/034 386/223 |
| 2005/0002535 A1 | 1/2005 | Liu et al. |
| 2005/0280701 A1 | 12/2005 | Wardell |
| 2007/0035612 A1 | 2/2007 | Korneluk et al. |
| 2009/0284601 A1 | 11/2009 | Eledath et al. |
| 2010/0034425 A1 | 2/2010 | Lin et al. |
| 2010/0050221 A1 | 2/2010 | McCutchen et al. |
| 2010/0299630 A1 | 11/2010 | McCutchen et al. |
| 2011/0214072 A1 | 9/2011 | Lindemann et al. |
| 2012/0057852 A1 | 3/2012 | Devleeschouwer et al. |
| 2012/0210252 A1 | 8/2012 | Fedoseyeva et al. |
| 2013/0070047 A1 | 3/2013 | Digiovanni et al. |
| 2013/0141526 A1 | 6/2013 | Banta et al. |

\* cited by examiner

APPARATUS AND METHOD FOR PANORAMIC VIDEO HOSTING

CROSS-REFERENCE TO RELATED APPLICATION

This application is a continuation of U.S. patent application Ser. No. 13/691,654, filed Nov. 30, 2012, which claims priority to U.S. Provisional Patent Application 61/566,269, filed Dec. 2, 2011, entitled "Panoramic video Camera System and Related Methods", the contents of which are incorporated herein by reference in their entireties.

FIELD OF THE INVENTION

This invention relates generally to panoramic video signal processing. More particularly, this invention relates to techniques for delivering segments of a panoramic video to networked client devices.

BACKGROUND OF THE INVENTION

Panoramic video images may be acquired using a group of cameras. The panoramic video images may be uploaded to a server where the images are made available to networked client devices. Consequently, the networked client devices may follow an event that is being panoramically videoed and request perspectives of interest. Such processing generates large volumes of video data that must be processed and transmitted in an efficient manner.

SUMMARY OF THE INVENTION

A server includes an input node to receive video streams forming a panoramic video. A module forms a suggested field of view in the panoramic video. An output node sends the suggested field of view to a client device.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
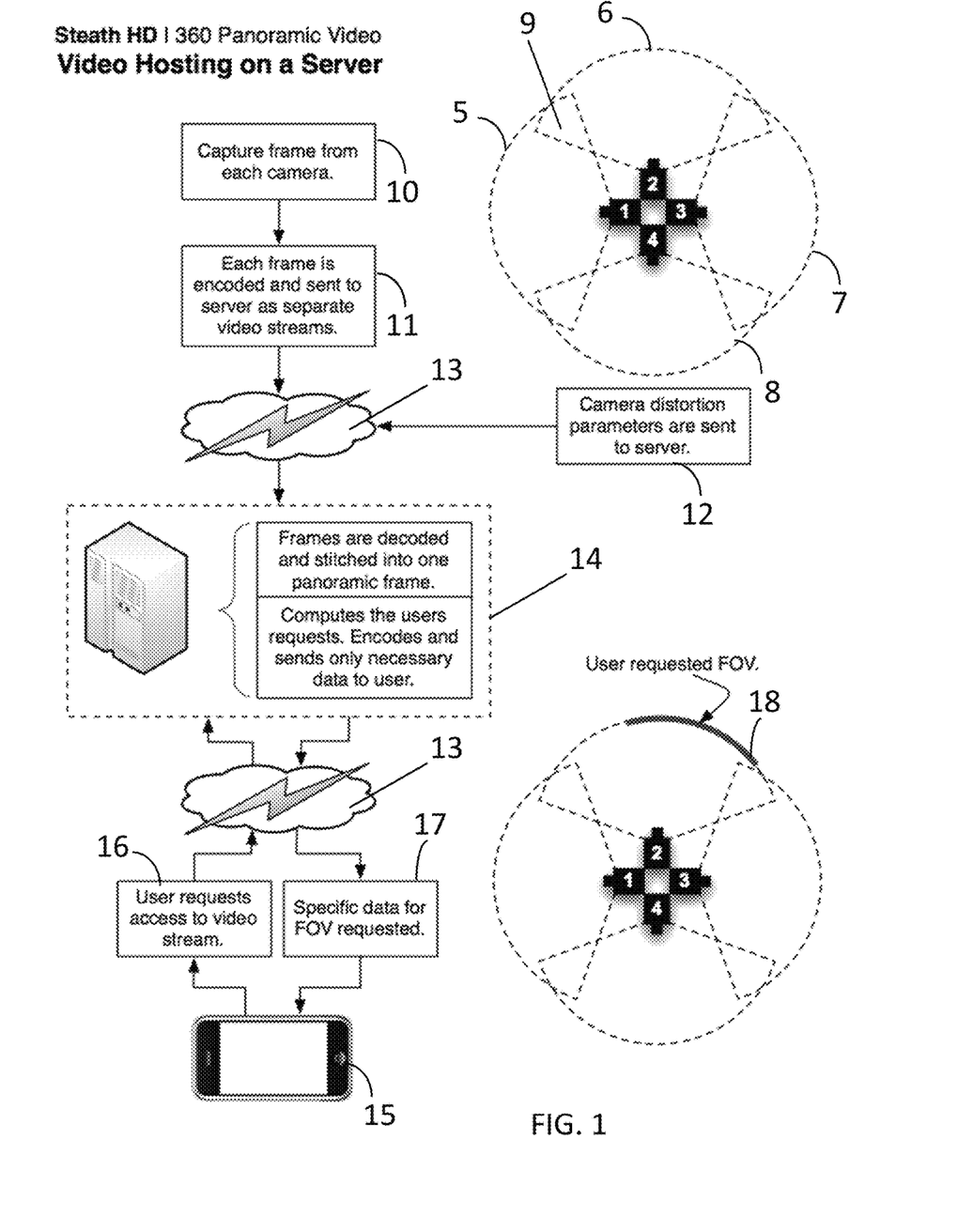
FIG. 1 illustrates a system configured in accordance with an embodiment of the invention.

FIG. 1 illustrates a system configured in accordance with an embodiment of the invention. In this example, the system includes four cameras 1, 2, 3 and 4. Each camera has a field of view, respectively 5, 6, 7 and 8, which forms a panoramic field of view. Field of view overlap regions 9 may exist.

Frames are captured from each camera 10 and then each frame is encoded and is sent to a server as a separate video stream 11. Camera distortion parameters may also be sent 12, as described in the commonly owned co-pending patent application entitled "Apparatus and Method for Video Image Stitching", Ser. No. 13/691,632, filed Nov. 30, 2012, the contents of which are incorporated herein by reference.

The cameras 1, 2, 3, 4 may include a wired or wireless link to network 13. Server 14 is also connected to network 13. An input node of the server 14 receives the video signals. The server 14 decodes frames and stitches them into a panoramic frame. The server 14 receives user requests and encodes necessary data to service each request. In one embodiment, the server includes a module with executable instructions to form a suggested field of view in the panoramic video. An output node of the server sends video signals to a client device.

The user requests are from a client device 15, such as Smartphone, Tablet, personal computer and the like. A user requests access to a video stream 16. The server 14 services the request and delivers the requested video through the network 13 as specific data for a requested field of view 17, which may then be displayed on the client device 15. FIG. 1 illustrates a requested field of view 18, which is a segment of the panoramic video image. The field of view 18 is a projection of video from the real world in a virtual space. By giving the user a virtual field of view within the projection space, users have the opportunity to navigate a real world environment within the virtual world. This allows users to virtually interact with real world content remotely real time, or at a later time after the video data has been captured. With the completed video stream, users can return to a real world event after an event and use their virtual field of view to engage with the real world content in new ways, as if they were experiencing the event again real time and in person.

The invention allows for multiple image processing services to be conducted on server 14. For example, the server 14 may provide error detection and correction. Further, the sever 14 may map and learn user interactions with the video content to optimize data streams. The server 14 can also monitor available bandwidth available on the network 13. The server 14 can then stream only field of view 18 to the device 15, or it can stream additional data outside of the field of view 18 to enable smoother navigation of the video stream. When additional data outside the field of view is sent to the client device, but the entire panoramic video stream is not streamed to the client device, this extra video data is referred to as the buffer.

This invention allows for additional image processing and error detection/correction to take place than would be typically available on a standalone panoramic camera system. The invention is especially helpful in situations where the panoramic video cameras are mobile or have limited processing power. Video hosting on the server reduces processing and power requirements at the camera system, while still providing high quality video to the end user. The server may be configured to provide field of view suggestions based on user data. The field of view suggestions may be based upon user field of view tracking. By monitoring user interactions with the video stream, the server 14 can perform two additional tasks. First, the host can suggest starting conditions that orient the user's field of view 18 in the most highly viewed area of the panoramic video stream. Second, the server can also steam the entire field of view in low resolution to the device 15 (if network 13 bandwidth allows) and then stream high resolution video data only for the field of view most viewed by other users on the system. In an entertainment use case, this embodiment of the invention can optimize the user experience because it allows the user to freely explore all 360 degrees of the video stream, but the transition from low resolution to high-resolution video will help guide users towards a viewing a specific field of view.

An ultra wide angle video stream has the ability to display more than 60 degrees of video content at one time. Some applications for ultra wide angle video may require image processing and/or data compression downstream from the image capture device. Image processing can be performed on a server or other host computer source that is connected to the image capture invention via the network 13, which may employ wireless data transmission, hard wired data transmission, or some other data transmission protocol such as satellite communications.

The server 14 provides additional image processing capabilities and has the ability to correct for errors created by the image capture device or errors created during the transmission of the data.

Data may be streamed from the video camera system to a server as 4 individual video streams that are unprocessed. These video streams could be raw or compressed data. The host server can then take these four camera streams, process the data to improve image quality, and stitch the images together to create a 360 degree video stream.

Because some users will be viewing the video content on devices that are not capable of processing ultra wide angle video, the server will provide additional image processing and compression algorithms than are available on the image capture device or on the viewing device. By communicating with an individual user's device, and monitoring how large portions of the viewing population is interacting with the video stream, software on the server will be able to estimate where a user is most likely to pan their individual frame of reference on their viewing device. For example, if a set of users are watching a panoramic video, the server may track panning sequences and popular fields of view to make estimates or suggestions for viewing perspectives. In this way, the host is able to communicate only the data needed to support a particular action, thus reducing the total amount of data that is streamed to every user. This prevents the entire video data stream from being sent to every single user. Sending the complete video stream to every user could overload the viewing system or network infrastructure that users are utilizing to download the video stream.

The social aspect of video interaction will enable users to view and experience a video in a similar way as a community or social group of users. Data about how each video file of ultra wide-angle video is viewed and navigated is saved and stored for later use.

Figure 2:
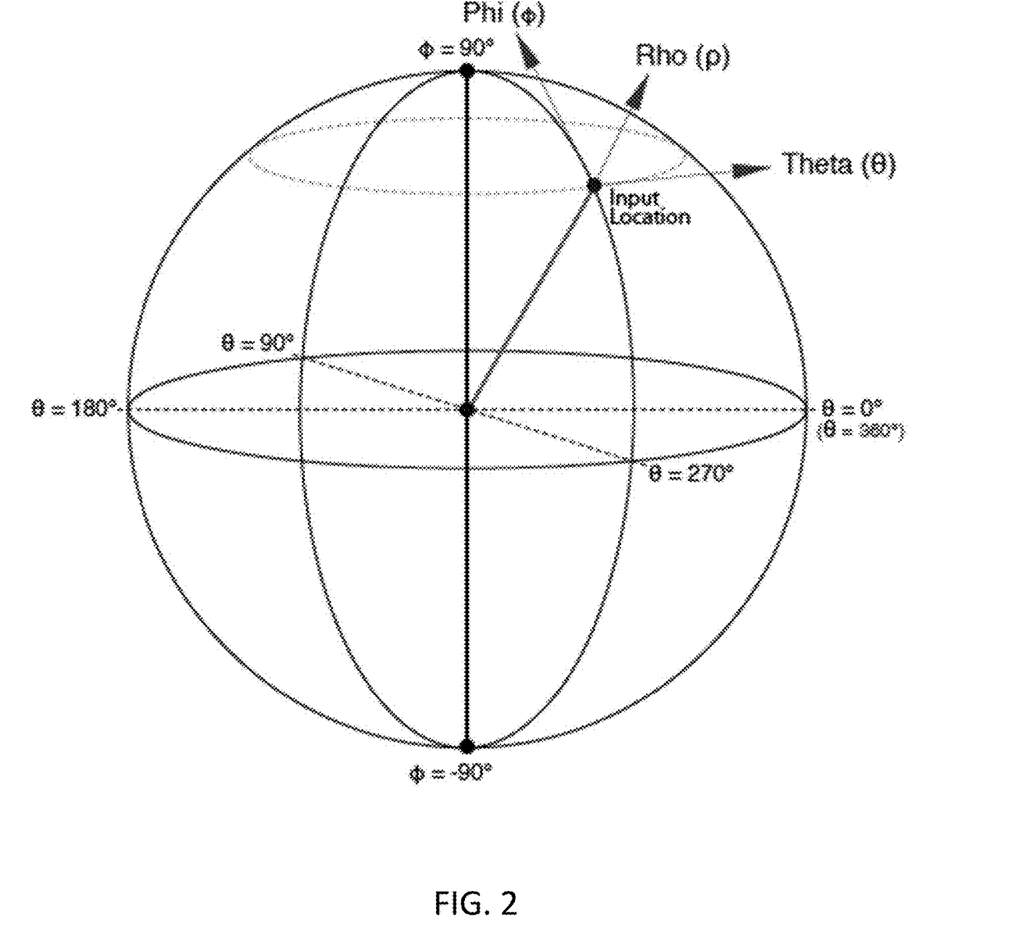
FIG. 2 illustrates a coordinate system that may be utilized in accordance with an embodiment of the invention.
Figure 3:
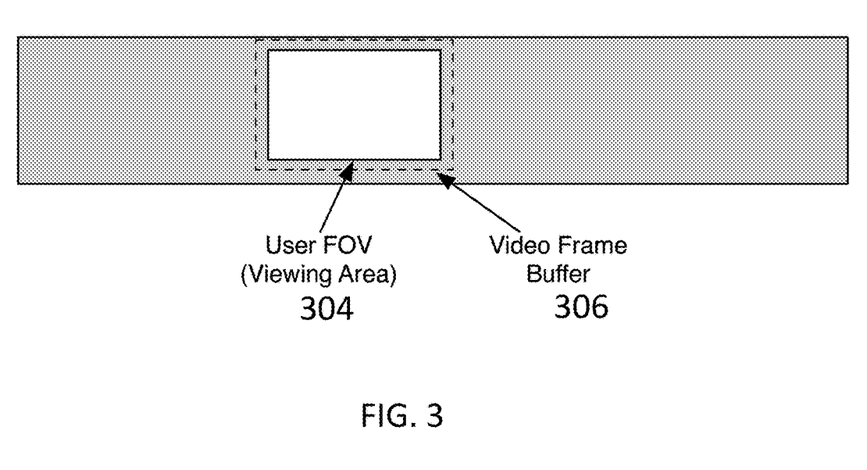
FIG. 3 illustrates field of view parameters associated with an embodiment of the invention.

To reduce the overall bandwidth when streaming 360° panoramic video content to the user, the coordinate system in FIG. 2 may be used to determine where the user is looking. Once that location is known only the specific video data in the user's field of view and a small buffer around the field of view is delivered via network stream to the user. In one embodiment, the user location is defined as the center point of the user's field of view, which is defined as 2× the height and 2× the width referenced from the user's location. This is demonstrated in FIG. 3. In particular, FIG. 3 illustrates a panoramic video frame 300 with a computed viewing location 302 within a field of view 304. A video frame buffer 306 is slightly larger than the field of view 304. This buffer may adaptively grow larger or smaller depending on the user's navigation speed and network bandwidth. If the user starts to pan quickly, the buffer would grow larger (if network bandwidth allows). If the user starts to pan more slowly, the buffer would grow smaller. In cases where network bandwidth is constrained, the buffer will be made as large as possible to enable the smoothest navigation experience within the viewing application. For scenarios where bandwidth is constrained, the size of the buffer area can be reduced to reduce the total amount of data that needs to be streamed over the network. As soon as the user's viewing area changes, the updated viewing location needs to be streamed to the host. If network speeds allow for the feedback loop in FIG. 1 (between the viewing device 15 and the host 14) to be instantaneous, then the buffer size can me reduced. When the feedback loop takes a meaningful amount of time to re-orient the user location and then stream new video data to the user, the buffer size should be 2× the average user's navigation speed. For example, if the average user navigates at 5 degrees per second, the buffer size should be 10 degrees on all sides of the viewing area.

In one embodiment, two input parameters are sent to the server. One parameter is the user's viewing location based upon the coordinate system of FIG. 2. The user location is defined as the center point 302 of the field of view 304. This input parameter is only sent to the server when it changes. Another parameter is the user's current field of view 304. This input parameter is only sent to the server when it changes.

In order to keep the video playing smoothly while the user moves, a small buffer 306 is added to the video frame. This gives the server time to respond to the change in location and update the video stream sent to the user accordingly without the user noticing disrupted video playback.

The following parameters may be used to calculate the user's location with respect to the panoramic frame in the coordinate system of FIG. 2.

$$\text{User Area} = (1280 \ px, 700 \ px)$$

$$panoHeight \text{ (total height of panoramic video stream)} = 720 \ px$$

$$panoWidth \text{ (total width of panoramic video stream)} = 4000 \ px$$

$$\rho(\text{radius}) = 340 \ px$$

$$\phi = 0°$$

$$\theta = 92°$$

$$x = \left(\frac{panoWidth}{360°}\right) * \theta$$

$$= \left(\frac{4000 \ px}{360°}\right) * 92°$$

$$= 1022 \ px$$

$$y = (panoHeight/2) - \rho * \sin\left(\phi * \frac{\pi}{180°}\right) * (panoHeight/180°/2)$$

$$= (720 \ px/2) - 340 \ px * \sin\left(0° * \frac{\pi}{180°}\right) * (720 \ px/180°/2)$$

$$= 360 \ px - 0 \ px = 360 \ px$$

The disclosed video hosting service allows for mobile video to be streamed live more efficiently since some of the image processing and image stitching processing can take place at the server, where it is not limited by battery power or processing constraints.

Applications include live sporting events where athletes, referees, or other equipment is outfitted with a panoramic video camera. Similar applications involve military or surveillance applications where it is not practical to have a complete processing system at the capture system due to weight, power, size, or other constraints. Since there will be many images streaming at once, and since many of these systems will have limited power supplies and processing power, the server allows for production of a much higher quality video stream for the end user.

By communicating with a large population of users, the server is able to establish and learn trends about where users are panning and zooming their individual frames of reference. By saving and processing this data, the software on the server is able to establish starting conditions that optimize the viewing experience and send suggestions to future users about where to navigate their individual frame of reference, leading to a more rewarding experience.

Servers tracking how populations and/or social groups are interacting with a video stream can allow the server to do a number of functions. For example, the server may set the home screen to the most popular field of view in the image circle. The server may send the highest quality video data to the most watched portions of the video stream and lower quality video data for other portions of the video stream. In this scenario, high definition video data may only be streamed to 80 degrees of the viewing area, leaving 280 degrees of video data to be streamed in a lower resolution. This reduction in resolution for selective parts of the video stream allows users to continue to experience high definition video at the most interesting area of the video, while also being able to freely navigate 360 degrees of video while consuming less network bandwidth. This scenario also guides users to a specific area of the video steam. This can be extremely useful in entertainment applications where users will be guided towards more interesting portions of the video stream because they are at a higher resolution. The server may also meter the data rates for portions of the image circle that are not getting high usage. Therefore, data can be sent between telecommunication companies and the host to throttle back data to certain portions of the video if there are bandwidth restrictions. User viewer data may also be used to crop the panoramic video and create a standard field of view video so that people can watch through widely available video servers like YouTube® or Vimeo®. This tracking information can also be used to allow one user to observe and experience another user's experience by following or subscribing to a certain users video stream and field of view.

Figure 4:
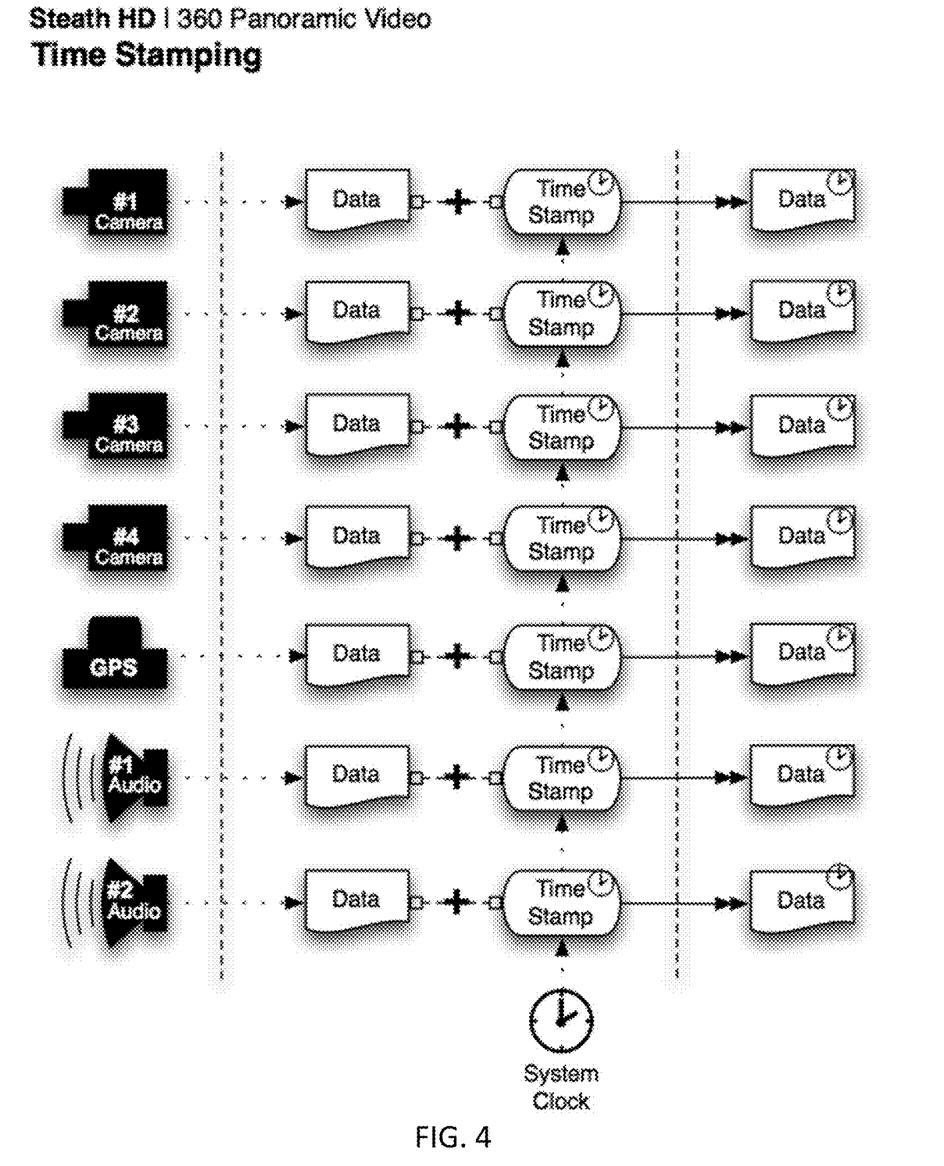
FIG. 4 illustrates a time stamping technique utilized in accordance with an embodiment of the invention.

FIG. 4 illustrates time stamping operations that may be performed in accordance with an embodiment of the invention. Each video stream is encoded with a timestamp before it is sent to the server for processing. This ensures that the server is accurately processing all frames synchronously regardless of network latency.

In one embodiment, the system has one clock or multiple clocks that are synchronized at startup (or at a specified interval). A time stamp is applied to each frame from each camera. Intervals could be 30 times per second to coincide with a 30 frames per second image capture rate. For a data streams like GPS that may only have 1 output per second, the GPS output will be time stamped at the next time stamping interval after output ($\frac{1}{30}^{th}$ of a second).

This allows for backend processing of multiple video streams and re-assembly of multiple image streams into a single, panoramic video stream. The time stamping is also applied to associated or complimentary data streams that may have been additional accessories to the panoramic video camera system. These accessories could include a microphone, digital compass, gyroscope, accelerometer, altimeter, GPS, or any other sensing device that may provide data that could be used or displayed with the video content.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method comprising:
 receiving, by at least one server, video data from a plurality of image sensors, including first video data captured by a first image sensor and second video data captured by a second image sensor, wherein the first video data is stitched together with the second video data in a panoramic video;
 receiving, by the at least one server, data representing a plurality of fields of view from the panoramic video, and wherein a first field of view of the plurality of fields of view and a second field of view of the plurality of fields of view have been requested for display by at least a first client device;
 determining that the first field of view was requested for display more times than the second field of view was requested for display;
 selecting the first field of view as a suggested field of view, wherein the suggested field of view includes a viewing angle that is less than a full field of view angle of the panoramic video, and wherein the suggested field of view comprises at least a portion of the first video data and at least a portion of the second video data; and
 sending a segment of the panoramic video from a viewpoint of the suggested field of view to the first client device.

2. The method of claim 1 wherein receiving the data representing the plurality of fields of view comprises receiving a field of view selection from the first client device.

3. The method of claim 1 wherein receiving the data representing the plurality of fields of view from the panoramic video comprises receiving a panning sequence from a second client device.

4. The method of claim 1 wherein selecting the first field of view as the suggested field of view comprises selecting as the suggested field of view a most popular field of view from the plurality of fields of view.

5. The method of claim 1, further comprising sending a buffer positioned around at least a portion of the segment of the panoramic video from the viewpoint of the suggested field of view to the first client device.

6. The method of claim 5, further comprising:
receiving, by the at least one server, an indication of a client device panning speed requested by the first client device; and
setting a size of the buffer.

7. The method of claim 1 wherein receiving the data representing the plurality of fields of view from the panoramic video comprises receiving from a second client device at least one current user center point within the panoramic video.

8. The method of claim 1 wherein receiving the data representing the plurality of fields of view from the panoramic video comprises receiving from a second client device at least one current user field of view within the panoramic video.

9. The method of claim 1, wherein the segment is a first segment and the viewpoint is a first viewpoint, the method further comprising:
sending a modified panoramic video to at least the first client device, wherein the modified panoramic video includes a second segment of the panoramic video from a second viewpoint outside the suggested field of view, and wherein the first segment of the panoramic video has a higher resolution in the suggested field of view than the resolution of the second segment from the second viewpoint outside the suggested field of view.

10. A computing device, comprising:
at least one processor;
a non-transitory computer-readable memory storing computer-executable instructions which when executed cause the at least one processor to perform a method comprising:
selecting a suggested field of view from a panoramic video, the panoramic video comprising first video data captured by a first sensor stitched together with second video data captured by a second sensor, wherein selecting the suggested field of view comprises:
receiving data representing a plurality of fields of view from the panoramic video, wherein a first field of view of the plurality of fields of view and a second field of view of the plurality of fields of view have been requested for display by at least a first client device;
determining that the first field of view was requested for display more times than the second field of view was requested for display; and
selecting the first field of view as the suggested field of view, wherein the suggested field of view includes a viewing angle that is less than a full field of view angle of the panoramic video, and wherein the suggested field of view comprises a first portion of the first video data and a second portion of the second video data; and
an output node effective to send to the first client device a segment of the panoramic video from a viewpoint of the suggested field of view.

11. The computing device of claim 10 wherein the computer-executable instructions, when executed by the at least one processor are effective to perform the method further comprising receiving the data representing the plurality of fields of view comprises receiving a field of view selection from the first client device.

12. The computing device of claim 10 wherein the computer-executable instructions, when executed by the at least one processor are effective to perform the method further comprising receiving the data representing the plurality of fields of view from the panoramic video comprises receiving a panning sequence from a second client device.

13. The computing device of claim 10 wherein the computer-executable instructions, when executed by the at least one processor are effective to perform the method further comprising selecting the suggested field of view comprises selecting a most popular field of view from the plurality of fields of view.

14. The computing device of claim 10, wherein the output node is effective to send the segment to the first client device by sending to the client device the segment and a buffer positioned around at least a portion of the segment.

15. The computing device of claim 14 wherein the computer-executable instructions, when executed by the at least one processor are effective to perform the method further comprising:
receiving an indication of a client device panning speed requested by the first client device; and
setting a size of the buffer based at least in part on the client device panning speed.

16. The computing device of claim 10 wherein the computer-executable instructions, when executed by the at least one processor are effective to perform the method further comprising receiving from a second client device a current user center point within the panoramic video.

17. The computing device of claim 10 wherein the computer-executable instructions, when executed by the at least one processor are effective to perform the method further comprising receiving from a second client device a current user field of view within the panoramic video.

18. The computing device of claim 10, wherein the computer-executable instructions, when executed by the at least one processor are effective to perform the method further comprising modulating video delivered to the first client device based upon a dynamic assessment of available network bandwidth.

19. The computing device of claim 10, wherein the computer-executable instructions, when executed by the at least one processor are effective to perform the method further comprising sending a modified panoramic video to the client device, wherein the modified panoramic video has a higher resolution in the suggested field of view than outside the suggested field of view.

20. The computing device of claim 10, wherein the computer-executable instructions, when executed by the at least one processor are effective to perform the method further comprising:
determining that a third field of view of the plurality of fields of view was requested for display less times than at least the first field of view; and
reducing a data rate of a second segment of the panoramic video from a second viewpoint of the third field of view;

wherein the output node is further effective to send the second segment of the panoramic video from the second viewpoint to a second client device requesting the third field of view.

* * * * *